United States Patent [19]

Beusse

[11] 4,368,900
[45] Jan. 18, 1983

[54] MINIMIZER SYSTEM OF VIBRATIONAL MOVEMENTS OF A MASS

[75] Inventor: Hans Beusse, Munich, Fed. Rep. of Germany

[73] Assignee: Messerschmitt-Boelkow-Blohm GmbH, Munich, Fed. Rep. of Germany

[21] Appl. No.: 200,191

[22] Filed: Oct. 24, 1980

[30] Foreign Application Priority Data

Oct. 27, 1979 [DE] Fed. Rep. of Germany ....... 2943486

[51] Int. Cl.³ .............................................. B60G 17/00
[52] U.S. Cl. ................................. 280/707; 267/64.13; 280/6 R
[58] Field of Search ....................... 280/707, 6 R, 709; 267/65 D

[56] References Cited

U.S. PATENT DOCUMENTS

3,603,612 9/1971 Hill et al. ........................... 280/707
4,105,216 8/1978 Graham et al. .................... 280/707

Primary Examiner—Richard A. Bertsch
Attorney, Agent, or Firm—W. G. Fasse; D. H. Kane, Jr.; D. F. Gould

[57] ABSTRACT

A mass such as a vehicle or craft, for example an aircraft, is cushioned against landing shocks and vibrations by an electronically controlled shock and vibration absorber system. For this purpose an electrical control signal is produced which takes into account several coefficients through the adjustment of potentiometers in a control circuit which continuously controls the damping characteristic curve of the shock and vibration absorber system.

11 Claims, 5 Drawing Figures

MINIMIZER SYSTEM OF VIBRATIONAL MOVEMENTS OF A MASS

CROSS-REFERENCE TO RELATED APPLICATIONS

The present application is based on German Patent Application No. P 2,943,486.4, filed in the Federal Republic of Germany on Oct. 27, 1979. The priority of the German filing date is claimed.

BACKGROUND OF THE INVENTION

The invention relates to a system for minimizing vibrational movements of a mass. More specifically, the invention relates to a circuit arrangement for controlling the operation of linearly and actively displaceable means which are conventionally arranged between the body of a vehicle or craft and its wheels, its floats, or the like. Such linearly and actively displaceable means will be referred to in the following text as "displaceable means". Conventional displaceable means shock absorbing devices of this type normally combine spring means with pneumatic or hydraulic displaceable members. The spring elements may comprise steel springs, so-called rubber springs, and/or air springs. It is also known to use hydraulic dampers or friction dampers for achieving an effective damping of impacts and/or vibrations. For example, in connection with the landing gear of aircrafts it is customary to use substantially exclusively shock absorbers comprising a so-called air spring and a hydraulic damper forming in combination a so-called oil air shock absorber. Single chamber shock absorbers are most frequently used and comprise substantially an air spring arranged in parallel to an oil damper or dash pot and this structure is satisfactory for many applications. A disadvantage of this type of structure is seen in its static spring characteristic curve which is by no means optimal. The damping factor is advantageous only for one descent speed. Further, the reaction to excessive speeds to be absorbed results in high load peaks which occur, for example, when the wheel passes over a bump in the ground.

In those instances where the above mentioned single chamber shock absorber is insufficient, it is known to use more complicated structures having characteristics adapted to the particular type of use. Thus, German Patent Publication (DE-OS) No. 2,150,406 discloses an oil pneumatic shock absorber device comprising two air chambers and several oil chambers which are interconnected through valves and/or throttling devices. The improved dynamic characteristic of such a system which has been achieved by such mechanical efforts and expenditures, approximates the optimal dynamic characteristic more closely than is possible with simpler structures. However, in no instance is it possible to realize the optimal dynamic response characteristic by purely mechanical means.

The dynamic response characteristic that must be satisfied by a system for minimizing vibrational movements is determined particularly by the mass of the vehicle or craft and is thus dependent on the size of the payload. Accordingly, the most advantageous dynamic response characteristic may be obtained only when the gross weight including the payload and the weight of the empty craft or vehicle, corresponds to the weight that has been taken into account when designing the system for minimizing vibrational movements. Thus, prior art systems of this type have, among others, the following disadvantages. The mechanical effort and expenditure is substantial. The total stroke capacity of the system is normally utilized only partially. The response characteristic depends largely on the vehicle mass and thus on the weight of the load.

OBJECTS OF THE INVENTION

In view of the above it is the aim of the invention to achieve the following objects singly or in combination:

to construct a system for minimizing vibrational movements which removes the disadvantages of similar prior art systems and which is suitable for all types of vehicles and crafts;

to construct a vibration minimizing system which has an optimal dynamic response characteristic substantially over a wide range of operating conditions;

to achieve the foregoing objectives with a minimal mechanical structural effort and expense;

to fully utilize the possible absorbing stroke of the system;

to make the response characteristic of the system substantially independent of the vehicle mass; and to provide for an adaptation to differing operating conditions by simply varying electrical values.

SUMMARY OF THE INVENTION

The vibration minimizing system according to the invention comprises at least one piston displaceable means in the form of a cylinder arrangement controllable in response to an input value (y) which is variable in its size and direction so that the speed of two connecting points of the piston cylinder arrangement, relative to each other, is proportional to the input value (y). This input value is supplied by first measuring the acceleration of the body's mass by means of at least one accelerometer operatively coupled to the body such as an aircraft. The measured acceleration value is an electrical signal which is passed through an active, frequency responsive electrical network in such a manner that, on the piston cylinder arrangement, a frequency responsive, spring damping characteristic is imposed which is substantially selectable, for example, by the manual or automatic adjustment of potentiometers. For this purpose a transducer, for example, a displacement transducer, supplies an electrical signal which corresponds to the displacement of the movable part of the piston cylinder arrangement, into the active circuit network through a potentiometer and an integrator in such a manner, that the movable part of the piston cylinder arrangement is returned into the central or rest position with a relatively large time constant, T thereby satisfying the equation:

$$F_{31} = \frac{1 + \frac{k}{T} \cdot \frac{1}{p^2}}{\frac{a}{T} \cdot p + \left(1 + \frac{b}{T}\right) + \frac{c}{T} \cdot \frac{1}{p} + \frac{k}{T} \cdot \frac{1}{p^2}},$$

wherein $F_{31}$ is the frequency dependent ratio between the characteristic excursions $Z_3/Z_1$ occurring in response to a harmonic excitation by an operator p, and wherein the values "a, b, c, and k" may be dependent on the time constant "T", of the piston cylinder arrangement and are otherwise freely selectable coefficients.

The time constant "T" of the piston cylinder arrangement may be determined by means of a function generator and a multiplier in such a manner that the time constant for returning the movable parts of the piston cylinder arrangement into the rest or central position is smaller when returning from an excursion near the end position than when returning from an excursion near the central position. In other words, the return from larger excursions is faster than from smaller excursions.

In order to assure a stable response characteristic of the system even in response to such an increase of a coefficient (k) that the system stability may be endangered, the output signal of an amplifier is supplied to a closed loop control or feedback amplifier which produces a lead control value. This lead control value in the form of a corresponding output signal of the feedback amplifer is supplied to an adjustment motor which adjusts the position of a potentiometer to make certain that the above basic equation is satisfied.

The above coefficients "a, b, c, and k" are produced by potentiometers in the network. These potentiometers are adjustable by adjustment motors which in turn are externally adjustable, for example, by manual adjustment.

The piston cylinder arrangement may be connected in series or in parallel with passive spring damping members of conventional construction.

In order to define a new starting or rest position for the piston cylinder arrangement, a signal is derived from a potentiometer type displacement transducer between a fixed zero tap and an adjustable wiper contact of the displacement transducer. This derived signal is applied to a summing network through an amplifier, a differentiator, and a function generator. The resulting control signal is used to modify the control input signal in such a manner that in response to shifting or adjusting said wiper contacts of the displacement transducer to any desired position, a further wiper contact connected to the movable member of the piston cylinder arrangement is automatically shifted to the same position as the first mentioned wiper contact.

To active electrical circuit network may be realized by analog, or digital electronic circuit means or it may be realized by a hybrid analog and digital circuit system.

The just summarized system according to the invention has a plurality of applications. Thus, for example, it is possible to substantially diminish the landing shock of an aircraft, thereby achieving a more advantageous weight factor of the aircraft body with regard to its dimensions. In the alternative, the operational life span of aircraft may be increased by the use of the present landing system shock absorber.

Another use of the invention is seen in connection with rail bound vehicles. According to the invention it is possible to compensate for vertical and cross accelerations of the vehicle caused by irregularities in the rail structure. Further, it is possible to achieve a coordinated negotiation of curves even if the speeds of the vehicle are varied while negotiating a curve. This feature opens up the possibility of using existing rail or track systems for future high speed trains. In such high speed trains the above mentioned piston cylinder arrangement would be replaced by linear electric motors.

BRIEF FIGURE DESCRIPTION

In order that the invention may be clearly understood, it will now be described, by way of example, with reference to the accompanying drawings, wherein:

FIG. 1 shows a circuit system according to the invention controlling a displaceable means such as a piston cylinder arrangement which could also be a linear electric motor or the like;

DETAILED DESCRIPTION OF PREFERRED EXAMPLE EMBODIMENTS AND OF THE BEST MODE OF THE INVENTION

Figure 1:
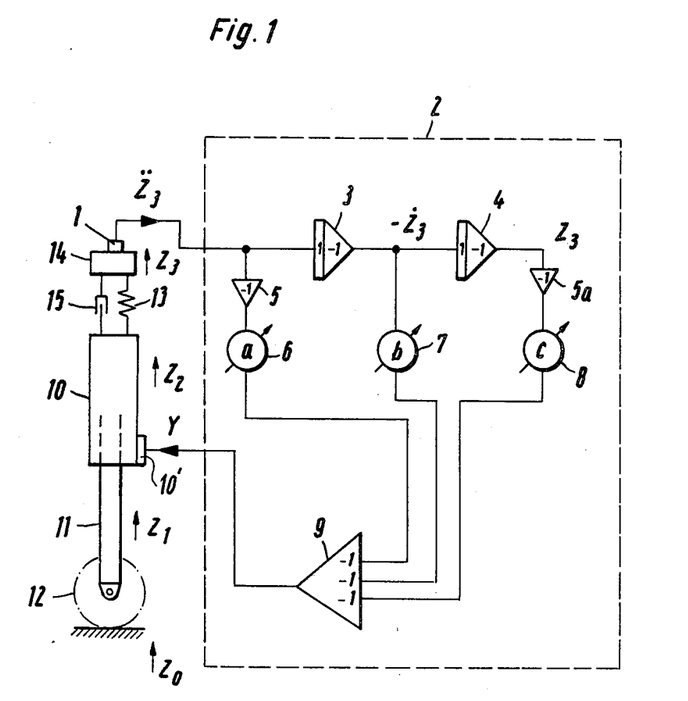

FIG. 1 shows a system according to the invention for the minimizing of vibrations comprising primarily a shock displaceable means 10, for example, in the form of a piston cylinder arrangement including a primarily movable member 11, such as the piston rod, and a cylinder. A landing gear wheel 12 is secured to the lower end of the movable piston rod 11. The cylinder is secured to the mass 14 such as an aircraft body through a coupling spring 13 and a coupling damper 15 such as a dash pot connected in parallel to the coupling spring 13. The elements or members 13 and 15, however, could also be connected in series and/or in parallel. An accelerometer 1 is operatively secured to the mass 14. The output of the accelerometer 1 is electrically connected to an adjustment network 2. The spring 13 and the movable members 15 are of conventional construction, for example, of the type used in the landing gear of aircrafts.

The electric circuit network 2 comprises two integrators 3 and 4 connected in series to the output of the accelerometer 1. A first inverting amplifier 5 connects a first adjustable potentiometer 6 for the coefficient "a" to the output of the accelerometer 1. A second potentiometer 7 for adjusting the coefficient "b" is connected to the output of the first integrator 3. A second inverting amplifier 5a connects a third adjustable potentiometer 8 for the coefficient "c" to the output of the second integrator 4. The outputs of the potentiometers 6, 7, and 8 are connected to the respective inputs of a summing amplifier 9 the output of which provides an electrical control signal "y" to an adjustment control 10' which adjusts the response characteristics of the piston cylinder arrangement 10. The adjustment control 10' may, for example, be in the form of a Sperry-Vickers-KG06-Type proportional valve. Incidentally, the wheel 12 is a component of any type of landing gear or understructure of a vehicle having a predetermined mass. In the illustrated example embodiment of FIG. 1 the mass 14 represents that proportion of the entire vehicle mass which is supported by the wheel 12 through the adjustable displaceable means 10.

A horizontal distance through which the vehicle or craft must travel normally will include certain bumps or the like represented by $Z_0$. Such bumps impart on the movable member 11 through the wheel 12 a movement corresponding to the displacement $Z_1$. This movement $Z_1$ longitudinally relative to the axis of the movable member 11 causes a movement of the vibration minimizing system, in the example of the cylinder which movement corresponds to a displacement $Z_2$. Thus, a displacement $Z_3$ is imparted to the mass 14 through the two coupling members 13 and 15. Due to the movement of the mass 14 the accelerometer 1 provides at its output an electrical signal proportional to the acceleration $\ddot{Z}_3$. This acceleration representing electrical signal is supplied to the inverting amplifier 5 and to the input of the integrator 3. The output of the inverting amplifier 5 is $-\ddot{Z}_3$ and is supplied to one input of the summing amplifier 9 through the coefficient potentiometer 6.

The integrator 3 delivers at its output an electrical signal $-\dot{Z}_3$ proportional to the speed of the mass 14. This speed signal $-\dot{Z}_3$ is supplied to the potentiometer 7 for the coefficient "b" and then to a second input of the summing or mixing amplifier 9. Additionally, the speed signal $-\dot{Z}_3$ is supplied to the integrator 4, the output of which supplies an electrical signal $Z_3$ proportional to the displacement of the mass m. The displacement signal $Z_3$ is supplied through an inverting amplifier 5a and the potentiometer 8 for the coefficient "c" to a third input of the summing amplifier 9.

The summing amplifier 9 forms out of the three negative input signals a positive control value or signal "y" which is converted by the control means 10' into a mechanical signal which causes the speed of the movable member 11 to vary in its size and direction. The control is such that the speed of the member 11 is just large enough and so directed that the displacement of the mass 14 is substantially compensated by the displaceable means 10, for example, in the form of a pressure supplied hydraulic piston cylinder arrangement. As mentioned, such piston cylinder arrangement may be replaced by a linear electric motor or a pneumatic system which is capable of delivering a mechanical output power as a result of a linear movement.

The following relationship exists between the control valve "y" and the movement $\Delta Z$ of the movable member 11.

$$y = T \cdot \Delta \dot{Z} = T(\dot{Z}_1 - \dot{Z}_2), \quad \text{Equation (1)}$$

wherein
$\dot{Z}_1$ = speed of the movable member 11;
$\dot{Z}_2$ = speed of the cylinder of the displaceable means 10;
T = the mean value of the time constant of the piston cylinder arrangment.

The following limit values are assumed:

$$\Delta \dot{Z} \leq \dot{Z}_{max} \quad \text{Equation (2)}$$

$$\Delta Z \leq Z_{max} \quad \text{Equation (3)}$$

In this assumption the internal mass effects of the vibration minimizing system have been disregarded. If we assume a rigid coupling 13, 15 between the members of the displaceable means 10 and the mass 14 and rigid wheel 12, we can assume:

$$Z_0 = Z_1 \; Z_2 = Z_3 \quad \text{Equation (3a)}$$

Thus, the following relationship exists between the adjustment or control value "y" and the values delivered by the circuit network 2.

$$y \infty a \ddot{Z}_3 + b \dot{Z}_3 + c Z_3 \quad \text{Equation (4)}$$

The differential equations (1) and (4) define the system which may be described by its frequency response characteristic. For this purpose the following substitutions are made.

$$Z_1 = \hat{Z}_1 \cdot e^{pt} \quad \text{Equation (5)}$$

wherein the following symbols have the following meaning
$\hat{Z}_1$ = peak value of $Z_1$;
e = is the base of the natural logarithms;
p = the imaginary operator $j\omega[s^{-1}]$; and
$\omega$ = the angular frequency.

The displacement ratio $Z_3/Z_1$ or rather the frequency response characteristic thereof may then be expressed as follows if $Z_1$ is introduced in a harmonic manner and if stationary conditions are assumed:

$$\frac{Z_3}{Z_1} = F_{31} = \frac{1}{\frac{a}{T} \cdot p + \left(1 + \frac{b}{T}\right) + \frac{c}{T} \cdot \frac{1}{p}} \quad \text{Equation (6)}$$

The ratio of the absolute values then becomes $$F_{31} = \frac{1}{\sqrt{\left(1 + \frac{b}{T}\right)^2 + \frac{1}{T^2}\left(a\omega - \frac{c}{\omega}\right)^2}} \quad \text{Equation (7)}$$

If $\omega = 0$ and $\omega = \infty$ then $|F_{31}| = 0$.
The angular frequency without an imaginary term corresponds $$\omega = \omega_o = \sqrt{\frac{c}{a}} \; ; \quad \text{Equation (8)}$$

whereby the maximum value for $F_{31}$ may be expressed as follows:

$$|F_{31}|_{max} \simeq \frac{1}{1 + \frac{b}{T}} \cdot \quad \text{Equation (9)}$$

The characteristics or rather the response characteristic of the vibration minimizing system are thus primarily determined by the active electric network, whereby the influence of the mass is eliminated for practical purposes. A special advantage of the system according to the invention is seen in the small excursions or displacements in response to low frequency vibrations.

Figure 2:
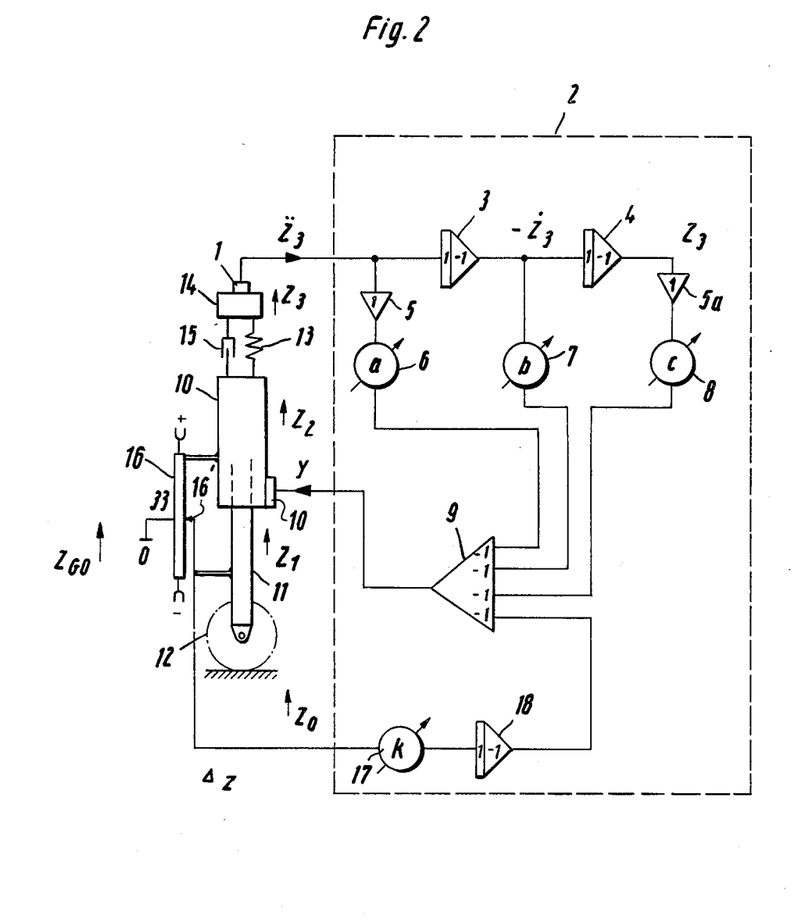
FIG. 2 is a circuit arrangement similar to that shown in FIG. 1, but showing the additional features for adjusting a central position for the piston cylinder arrangement or linear electromotor.

The system according to the invention can also be adapted to be quite useful even if the pistons through which the vehicle or craft travels are inclined when, for example, the vehicle travels uphill. FIG. 2 accordingly shows a system according to the invention with a trailing level adaptation. The system of FIG. 2 comprises substantially the components also shown in FIG. 1 and is additionally equipped with a displacement transducer 16 having a fixed tap 33 and a wiper contact 16'. A coefficient potentiometer 17 for the coefficient "k" is connected to the wiper contact 16' and to an input of an integrator 18, the output of which is connected to a fourth input of the summing amplifier 9 as shown in FIG. 2. The potentiometer 17 is adjusted to the relatively small coefficient "k". If the wheel 12 must run over a bump in the ground the vertical movement of the mass 14 is reduced to a minimum as described above. For this purpose the displacement transducer 16 in the form of a potentiometer as described, provides a signal which corresponds to the displacement $\Delta Z$ of the movable member 11 out of its central position. The central position is defined by the potential 0. The displacement or excursion signal $\Delta Z$ is supplied through the coefficient potentiometer 17 where it is multiplied by the factor k, to the input of the integrator 18. The integrated signal is applied to a further input of the summing amplifier 9. Due to the small coefficient "k" a relatively large time constant $\sqrt{T/k}$ is accomplished. As a result, the $\Delta Z$ signal does not become effective when the wheel 12 rolls over a short bump in the surface. However, when the wheel travels on an ascending section of the surface, or when a descending section must be negotiated, a different response will be achieved. In this instance the displacement transducer 16 senses a displacement $\Delta_z$ over a relatively long time period, whereby the corresponding integrated signal makes sure that the movable member 11 is returned into its central position through the summing amplifier 9. Thus, the system according to FIG. 2 is independent of an ascending section in the road or landing strip. Due to taking into account of $\Delta Z = Z_1 - Z_3$ the following differential equation becomes available:

$$y = a \cdot \ddot{Z}_3 + b \dot{Z}_3 + c Z_3 + k \int (Z_3 - Z_1) \, dt \qquad \text{Equation (10)}$$

If we assume a rigid coupling between the displaceable means 10 and the mass 14 then the excursion $Z_{Go}$ of the wiper contact 16' out of its central or zero position becomes:

$$Z_{Go} = Z_3. \qquad \text{Equation (11)}$$

The frequency characteristic $F_{31}$ may then be expressed as follows:

$$F_{31} = \frac{1 + \left[\dfrac{k}{T} \cdot \dfrac{1}{p^2}\right]}{\dfrac{a}{T} \cdot p + \left(1 + \dfrac{b}{T}\right) + \dfrac{c}{T} \cdot \dfrac{1}{p} + \left[\dfrac{k}{T} \cdot \dfrac{1}{p^2}\right]} \qquad \text{Equation (12)}$$

In Equation (12) the equation components enclosed by dashed lines represent the influence of the level adaptation.

Figure 3:
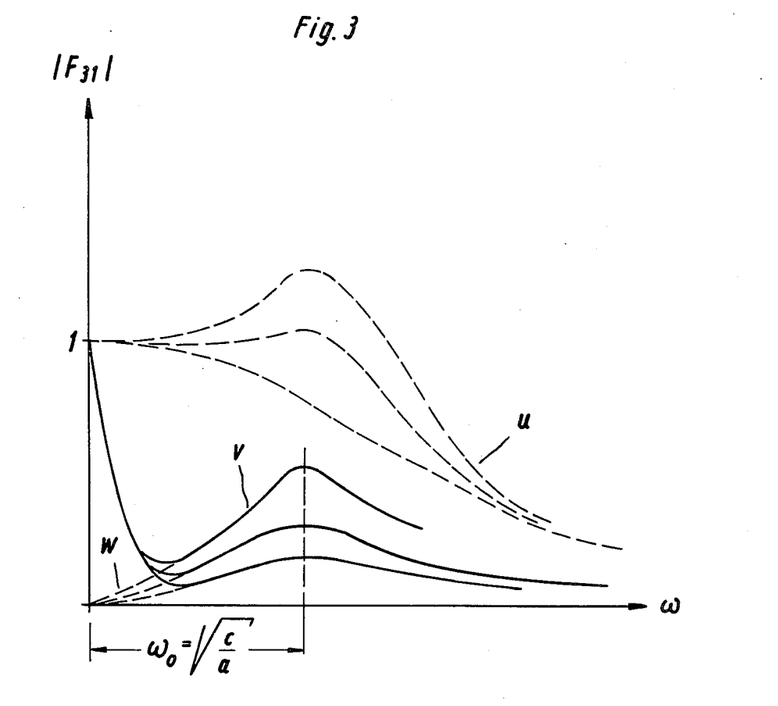
FIG. 3 shows the ratio between the characteristic excursions of the shock absorber system as a function of the angular frequency.

FIG. 3 shows a comparison of several frequency response characteristic curves. The curves "u" correspond to the frequency characteristics of prior art shock absorbers, namely passive spring damping devices.

Contrary thereto, the curves "v" represent frequency characteristics which may be realized by a system according to the invention. These functions are obtained from Equation (12). The most significant characteristic of the curves "v" is seen in that they represent a very low or small value for $F_{31}$ over the entire frequency range. By a zero adjustment of the potentiometer 17 (k=0) the curves "v" begin at the origin of the coordinate system as indicated by the dashed extensions "w" in FIG. 3. In the origin $F_{31}$ is = to 0.

Figure 4:
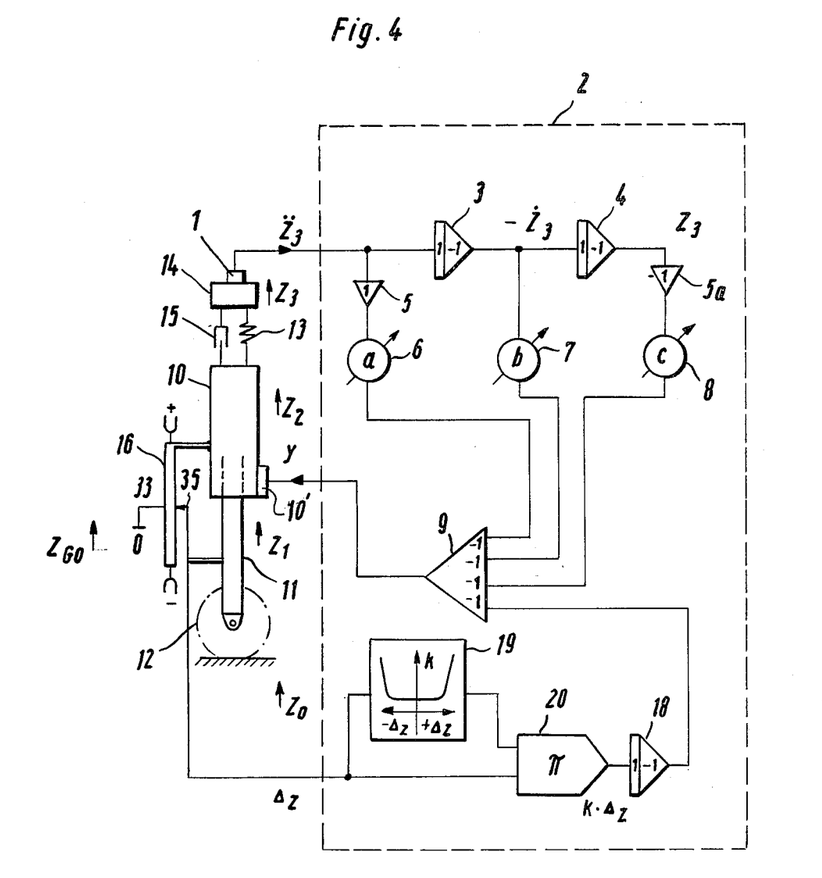
FIG. 4 is a circuit system similar to that of FIG. 2 expanded to include a k-function generator.

FIG. 4 illustrates a further example embodiment of the invention in which again the basic circuit of FIG. 2 is employed and in which additionally, the coefficient "k" is produced by a function generator 19 and a multiplier 20 interconnected as shown in FIG. 4. This circuit arrangement makes it possible to increase the coefficient "k" in the region of the end positions of the movable member 11, whereby the latter may be returned to the central position more rapidly. For this purpose Equation (12) provides a stability condition as follows:

$$\frac{a \cdot k}{T} - \left(1 + \frac{b}{T}\right) \cdot c < 0. \qquad \text{Equation (12a).}$$

In certain instances it may be necessary to locate the zero position of the movable member 11 at any desired location, for example, in an end position. This feature may be obtained by providing a variable zero or base position. If the new base position is referred to as $Z_G$ then the following differential equation will apply for the tansition into the new zero position.

$$-T\ddot{Z}_3 = a \ddot{Z}_3 + b \dot{Z}_3 + c Z_3 + k \int (Z_3 - Z_G) \, dt \qquad \text{Equation (13)}$$

$$Z_1 = 0 \qquad \text{Equation (14)}$$

The corresponding frequency response characteristic then satisfies:

$$\frac{Z_3}{Z_G} = F_{3G} = \frac{1}{1 + \dfrac{c}{k} \cdot p + \dfrac{b + T}{k} \cdot p^2 + \dfrac{a}{k} \cdot p^3} \qquad \text{Equation (15)}$$

providing the following stability condition:

$$a - \frac{(b + T) \cdot c}{k} < 0. \qquad \text{Equation (15a)}$$

Starting from substantially optimal operating adjustment for the coefficients "a, b, c, and k" it is possible that an increase in the coefficient "k" could also result in a strong reduction of the damping that is in an instability of the system. To avoid such instability the invention provides that the coefficient or factor "a" according to Equation (12) is diminished in response to the increase of the coefficient "k" by means of a closed loop control circuit.

Figure 5:
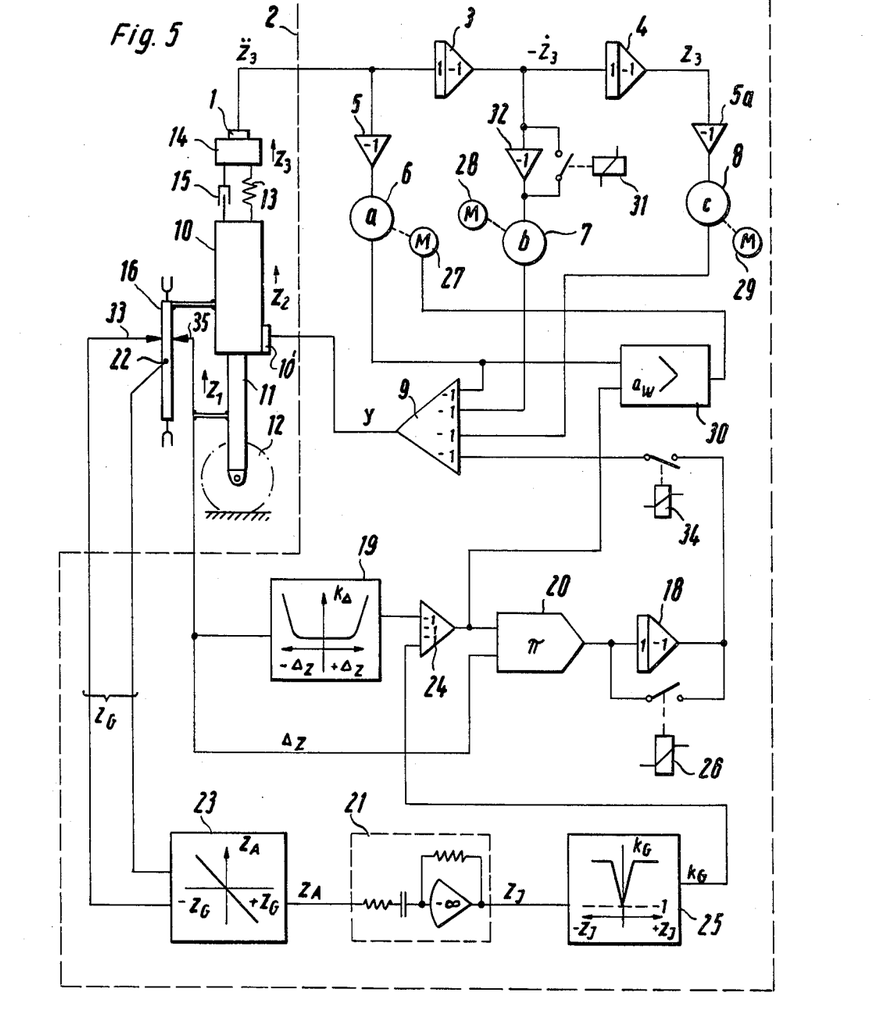
FIG. 5 shows the circuit arrangement according to FIG. 4, modified with further components for realizing a selectable base or starting position of the vibration minimizing system.

FIG. 5 illustrates a system including such a closed loop control circuit. The system according to FIG. 5 comprises substantially the elements of FIG. 4 and additionally a differentiating circuit 21, a tap 22 on the displacement transducer 16, an amplifier 23, a summing network 24, a further function generator 25, three relays 26, 31, and 34, as well as adjustment motors 27, 28, 29, and a closed loop control circuit 30 as well as a further inverting amplifier 32 and an adjustable tap 33' on the displacement transducer 16. The just enumerated elements are operatively interconnected as shown in FIG. 5.

In FIG. 5 it is possible to adjust the base position of the movable piston rod or member 11 by a respective adjustment of the wiper contact 33' on the displacement transducer 16. The fixed tap 22 provides the constant 0 potential. The difference $Z_G$ between the two signals at the taps 22 and 33' are supplied to the operational amplifier 23. The differentiating network 21 forms from the output signal $Z_A$ a time responsive signal $Z_J$ in response to abrupt adjustment changes at the displacement transducer 16. The signal $Z_J$ is supplied to the function generator 25 which delivers temporarily a large constant output value $k_G$. The output value $k_G$ is mixed in the summing network 24 with the k-value provided by the function generator 19. The resulting k-value is then further processed with the deviation or difference $\Delta_Z$ as described above with reference to FIG. 4.

The duration during which the differentiator 21 and the function generator 25 are effective may be selected by a suitable dimensioning of these components and the resulting signals may be developed with due regard to the other characteristic values or coefficients "a", "b", and "c". The potentiometers 6, 7, and 8 are adjustable by adjustment motors 27, 28, and 29 respectively. Particularly, the motor 27 is adjusted in response to large resulting k-values at the output of the summing network 24, in such a manner by means of the closed loop circuit 30 that the required reduction of the coefficient "a" assures at least the dynamic stability in accordance with the Equations (12a) and (15a).

The value $a_w$ in the closed loop control circuit 30 corresponds to the rated value for "a" and is formed from the resulting k-value. A short duration stiffening of the shock absorbing system at higher frequencies $\omega$ is acceptable in the end positions of the shock absorber or when the 0 position is adjusted. In a first approximation this influence may be seen from FIG. 3. The adaptability of the system according to the invention due to the automatically adjustable coefficients "a, b, c, and k" will now be shown with reference to the following set of requirements that are to be satisfied.

The vertical braking deceleration for a landing aircraft or for a body such as a vehicle dropped from an aircraft, shall be substantially constant and the entire stroke capacity of the vibration minimizing system shall be utilized. In this context the following values are defined:

$V_{oz}$ = sinking speed (of the aircraft)      Equation (16)

$\lambda$ = constant vertical braking deceleration      Equation (17)

$S_Z$ = maximum stroke or displacement of the shock absorber      Equation (18)

According to Equation (19) the maximum possible deceleration is expressed as follows:

$$\eta_{max} = \frac{V_{oz}^2}{2 \cdot S_z} \quad \text{Equation (19)}$$

For extending of the displaceable means to its maximum stroke without ground contact, the coefficients "a, b, c" are adjusted to 0, whereby the following applies:

$$-T\dot{Z}_3 = k_G(Z_3 - Z_G) \Rightarrow \frac{Z_3}{Z_G} = \frac{1}{1 + \frac{T}{k_G} \cdot p} \quad \text{Equation (20)}$$

$$Z_G = Z_{Gmax} \cong S_z \quad \text{Equation (21)}$$

For this purpose the integrator 18 is short circuited through the relay 26.

With the Equations (1), (2), (16), and (17) the following applies:

(1) (16) (17) $\Rightarrow Y \cong T(\dot{Z}_1 - \dot{Z}_3) = T(V_{oz} - \oplus \cdot t)$      Equation (22)

(2) (17) $\Rightarrow y \cong a\ddot{Z}_3 + b\dot{Z}_3 = a\beta + b\beta \cdot t$      Equation (23)

From the above equations the coefficients may be expressed as follows:

$$a = \frac{T \cdot V_{oz}}{\beta} \quad \text{Equation (24)}$$

$$b = -T \quad \text{Equation (25)}$$

$$c, k = 0 \quad \text{Equation (26)}$$

To satisfy Equation (25) the inverting amplifier 32 is switched on through the relay 31. For satisfying Equation (26) the output of the integrator 18 is interrupted by the relay 34. During the rolling or driving on the ground, advantageous potentiometer adjustments for the coefficients "a, b, c" are accomplished through the respective adjustment motors which in turn may be manually adjusted or by a computer control while the relays 26, 31, and 34 are switched off. By means of the just described circuit and vibration minimizing system and its function, it is possible to achieve a substantial reduction of the landing impact as compared to prior art shock absorber systems. In connection with aircraft it is suitable to use for the linearly and actively displaceable means, hydraulic piston cylinder arrangements.

The teaching of the invention is not limited to the illustrated example. Rather, the invention is intended to cover all equivalent solutions within the scope of the claims, whereby the respective systems must be capable of satisfying the conditions set forth in the Equation (12). At least one adjustment means such as a hydraulic piston cylinder or an electric linear motor will have to be used as well as at least one accelerometer. The system has been described with reference to an analog data processing circuit network. However, the system may also be made by using a digitally operating data processing circuit.

Although the invention has been described with reference to specific example embodiments, it will be appreciated, that it is intended, to cover all modifications and equivalents within the scope of the appended claims.

What is claimed is:

1. A system for minimizing vibration movements of a mass, comprising linearly and actively displaceable means including members movable relative to each other, means for operatively connecting said displaceable means to said mass, control means (10') operatively connected to said displaceable means for controlling the operation of said displaceable means in response to an electrical control signal (y), frequency responsive electrical circuit means for producing said electrical control signal (y), said frequency responsive electrical circuit means comprising acceleration measuring means (1) operatively connected to said mass for producing an electrical signal corresponding to the acceleration of said mass, first and second signal integrating means (3, 4) connected in series to said acceleration measuring means for providing a series circuit delivering said acceleration signal, a speed signal, and a displacement signal in that order, first adjustable potentiometer means (6) operatively connected to said series circuit to provide a first coefficient signal (1), second adjustable potentiometer means (7) operatively connected to said first integrating means (3) to provide a second coefficient signal (b), third adjustable potentiometer means operatively connected to said second integrating means to provide a third coefficient signal (c), and summing amplifier means (9) operatively interconnecting said potentiometer means and said control means (10') for imposing on said displaceable means a frequency dependent response characteristic whereby the movable members of said displaceable means move relative to each other with a speed which is proportional to said electrical control signal (y), said system further comprising displacement transducer means (16, 16', 33) operatively interposed between said relatively movable members of said displaceable means, and function control means (17, 18, 19, 20) operatively interconnecting said displacement transducer means (16, 16', 33) and said summing amplifier means (9) for producing a fourth coefficient signal (k), whereby one of said movable members (11) of said displaceable means may be returned into a central or zero position relative to another member of said displaceable means with a relatively large time constant $\sqrt{K/T}$ satisfying the equation:

$$F_{31} = \frac{1 + \frac{k}{T} \cdot \frac{1}{p^2}}{\frac{a}{T} \cdot p + \left(1 + \frac{b}{T}\right) + \frac{c}{T} \cdot \frac{1}{p} + \frac{k}{T} \cdot \frac{1}{p^2}}$$

wherein $F_{31}$ is the frequency dependent ratio between the characteristic excursions $Z_3/Z_1$ occurring in response to harmonic excitations by an operator p, and wherein the coefficient values "a, b, c, and k" are freely selectable coefficients.

2. The system of claim 1, wherein said function control means comprise an adjustable fourth potentiometer (17) and an inverting amplifier (18) operatively connected in series between said displacement transducer means (16) and said summing amplifier means (9), for producing said fourth coefficient signal (k).

3. The system of claim 1, wherein said function control means comprise a function generator (19) and a multiplier network (20) operatively connected between said displacement transducer means (16) and said summing amplifier means (9) whereby the time constant may be determined in such a manner that a rapid return of the movable member (11) of said displaceable means into its zero position is achieved when it returns from large excursions and a relatively slow return is achieved when it returns from small excursions.

4. The system of claim 1, further comprising adjustment motor means (27) operatively connected to said first potentiometer means (6), control amplifier means (30) operatively connected to said adjustment motor means and to said function control means (19) for producing an adjustment value ($a_w$) at the output of said control amplifier means (30) for adjusting said first potentiometer means (6) in response to said adjustment value ($a_w$) whereby a stable operation is assured even if the fourth coefficient signal (k) should increase beyond a stable value.

5. The system of claim 4, wherein said control amplifier means (2) forms a closed loop control.

6. The system of claim 1, further comprising first, second, and third adjustment motor means (27, 28, 29) operatively connected to said first, second, and third potentiometer means (6, 7, 8) respectively for externally adjusting said potentiometer means.

7. The system of claim 1, wherein said connecting means for operatively connecting said displaceable means to said mass comprise passive spring damping means arranged in series or parallel fashion between said mass and said shock absorber means.

8. The system of claim 1, further comprising displacement transducer means (16) operatively connected to said linearly and actively movable displaceable means, said displacement transducer means (16) comprising a fixed potential providing output (22) and a variable potential providing output (33'), amplifier means (23) operatively connected to said outputs (22, 33'), signal differentiating means (21) operatively connected to said amplifier means 823), function generator means (25) operatively connected to said differentiating means (21), summing circuit means (24) operatively connected to said function generator means (25) and to said function control means (19), and further circuit means (20, 18, 34) operatively connecting said summing circuit means (24) to said first mentioned summing amplifer means (9) in such a manner that in response to a change of said variable potential output (33'), said relatively movable displaceable means is shifted into a corresponding new zero position by said electrical control signal (y).

9. The system of claim 8, wherein said displacement transducer means comprise a resistor including a fixed tap (22) forming said fixed potential output, a slidable wiper contact (33') forming said variable potential output, and a further slidable wiper contact (35) operatively connected to said relatively movable displaceable means and to said function control means, whereby an adjustment of said slidable wiper contact (33') to a new position automatically moves the further slidable wiper contact (35) into a correspondingly new position which defines a new zero position of said relatively movable displaceable means.

10. The apparatus of claim 1, wherein said frequency responsive electrical circuit means are analog or digital or hybrid analog/digital electronic circuit means.

11. A method for controlling the frequency response characteristic of a system for minimizing vibrational movements of a mass by linearly and actively displaceable means including displaceable members movable relative to each other and connected to said mass, comprising the steps of:
(a) measuring the acceleration of a mass to be cushioned by said displaceable means to provide a respective electrical acceleration representing signal,
(b) first, integrating said acceleration representing signal to provide a speed representing signal,
(c) second, integrating said speed representing signal to provide a displacement representing signal,
(d) producing from each of said acceleration representing signal, from said speed representing signal, and from said displacement representing signal a respective coefficient signal, to thereby provide three coefficient signals,
(e) producing in response to the displacement of said displaceable means a fourth coefficient signal (k),
(f) summing said coefficient signals to produce a control signal,
(g) supplying said control signal to control means for said displaceable means, whereby said control signal is proportional to the relative speed between two members of said system, whereby one of said movable member (11) of said displaceable means may be returned into a central or zero position relative to another member of said displaceable means with a relatively large time constant $\sqrt{T/k}$ satisfying the equation:

$$F_{31} = \frac{1 + \frac{k}{T} \cdot \frac{1}{p^2}}{\frac{a}{T} \cdot p + \left(1 + \frac{b}{T}\right) + \frac{c}{T} \cdot \frac{1}{p} + \frac{k}{T} \cdot \frac{1}{p^2}}$$

wherein $F_{31}$ is the frequency dependent ratio between the characteristic excursions $Z_3/Z_1$ occurring in response to harmonic excitations by an operator p, and wherein the coefficient values "a, b, c, and k" are freely selectable coefficients.

* * * * *

$$F_{31} = \frac{1 + \frac{k}{T} \cdot \frac{1}{p^2}}{\frac{a}{T} \cdot p + \left(1 + \frac{b}{T}\right) + \frac{c}{T} \cdot \frac{1}{p} + \frac{k}{T} \cdot \frac{1}{p^2}}$$

wherein $F_{31}$ is the frequency dependent ratio between the characteristic excursions $Z_3/Z_1$ occurring in response to harmonic excitations by an operator p, and wherein the coefficient values "a, b, c, and k" are freely selectable coefficients.

* * * * *

UNITED STATES PATENT AND TRADEMARK OFFICE
CERTIFICATE OF CORRECTION

PATENT NO. : 4,368,900
DATED : January 18, 1983
INVENTOR(S) : Hans Beusse

It is certified that error appears in the above-identified patent and that said Letters Patent is hereby corrected as shown below:

Column 10, line 61 (Claim 1) "signal (1)," should read: --signal (a),--.

Column 11, line 16 (Claim 1) "$\sqrt{K/T}$" should read: --$\sqrt{T/k}$--.

Column 11, line 58 (Claim 5) "means (2)" should read: --means--.

Column 11, line 68 (Claim 7) "shock absorber means." should read: --displaceable means--.

Column 12, line 9 (Claim 8) "823)," should read: --(23),--.

Column 14 should be deleted since it is a copy of column 13.

Signed and Sealed this

Fifteenth Day of March 1983

[SEAL]

Attest:

GERALD J. MOSSINGHOFF

Attesting Officer

Commissioner of Patents and Trademarks